(12) United States Patent
Wang (10) Patent No.: US 8,268,744 B2
(45) Date of Patent: Sep. 18, 2012

(54) HIGH SHEAR METHOD FOR MANUFACTURING A SYNTHETIC SMECTITE MINERAL

(75) Inventor: Zhen Wang, Lake Zurich, IL (US)

(73) Assignee: Amcol International Corporation, Hoffman Estates, IL (US)

( * ) Notice: Subject to any disclaimer, the term of this patent is extended or adjusted under 35 U.S.C. 154(b) by 125 days.

(21) Appl. No.: 12/485,561

(22) Filed: Jun. 16, 2009

(65) Prior Publication Data

US 2010/0317509 A1    Dec. 16, 2010

(51) Int. Cl.
*B01J 29/04*    (2006.01)
*B01J 21/16*    (2006.01)

(52) U.S. Cl. .................. 502/62; 502/80; 502/84
(58) Field of Classification Search .......... None
See application file for complete search history.

(56) References Cited

U.S. PATENT DOCUMENTS

| | | | |
|---|---|---|---|
| 3,807,702 A * | 4/1974 | Grillo et al. | 366/325.2 |
| 4,094,777 A | 6/1978 | Sugier et al. | |
| 4,361,493 A | 11/1982 | Kiefer | |
| 5,245,106 A | 9/1993 | Cameron et al. | |
| 5,248,641 A * | 9/1993 | Bauer et al. | 501/145 |
| 6,719,828 B1 | 4/2004 | Lovell et al. | |
| 7,048,781 B1 * | 5/2006 | Lovell | 95/134 |
| 7,288,499 B1 | 10/2007 | Lovell et al. | |
| 7,468,170 B2 | 12/2008 | Comrie | |
| 7,578,869 B2 | 8/2009 | Lovell | |
| 7,753,992 B2 | 7/2010 | Yang et al. | |
| 2002/0018853 A1 | 2/2002 | Khare | |
| 2003/0104937 A1 | 6/2003 | Sinha | |
| 2006/0210463 A1 | 9/2006 | Comrie | |
| 2007/0119300 A1 | 5/2007 | Yang et al. | |
| 2007/0122327 A1 | 5/2007 | Yang et al. | |
| 2007/0122619 A1 | 5/2007 | Yang et al. | |
| 2007/0140941 A1 | 6/2007 | Comrie | |
| 2007/0140943 A1 | 6/2007 | Comrie | |
| 2007/0289447 A1 | 12/2007 | Yang et al. | |
| 2007/0292328 A1 | 12/2007 | Yang et al. | |
| 2008/0121142 A1 | 5/2008 | Comrie et al. | |
| 2011/0123422 A1 | 5/2011 | Wang | |

FOREIGN PATENT DOCUMENTS

| | | |
|---|---|---|
| EP | 0145539 | 6/1985 |
| EP | 0480603 | 4/1992 |
| WO | WO-2006006978 A1 | 1/2006 |
| WO | WO-2008064360 | 5/2008 |
| WO | WO-2009017811 A2 | 2/2009 |
| WO | WO-2010147781 A1 | 12/2010 |

OTHER PUBLICATIONS

Bragg et al., "Crystal Structures of Minerals," *Cornell University Press* (1965).
Using Lime for Flue Gas Treatment, available at <http://www.lime.org/documents/publications/free_downloads/fgd-final-2000.pdf> (2000).
Smith, Cement and Concrete-Benefits and barriers in coal ash ustilisation, CCC/94—ISBN 929029-409-4 (Jan. 1, 2005).
Burba et al., "The Orientation and Interaction of Ethylenediamine Copper (II) with Montmorillonite," *Clays and Clay Minerals*, 25:113-118 (1977).
Ding et al., "Removal of Gas-Phase Elemental Mercury in Flue Gas by Inorganic Chemically Promoted Natural Mineral Sorbents," *Ind. Eng. Chem. Res.*, 51:3039-3047 (2012).
Ding et al., "Thermal study of copper adsorption on montmorillonites," *Thermochimica Acta*, 416:11-16 (2004).
El-Batouti et al., "Kinetics and thermodynamics studies of copper exchange on Na-montmorillonite clay mineral," *J. Colloid and Interface Sci.*, 259:223-227 (2003).
Ghorishi et al., "Development of a CI-Impregnated Activated Carbon for Entrained-Flow Capture of Elemental Mercury," *Environmental Sci. & Tech.*, 36:4454-4459 (2002).
Granite et al., "Novel Sorbents for Mercuery Removal from Flue Gas," *Ind. Eng. Chem. Res.*, 39:1020-1029 (2000).
Habashi et al., "The Reduction of Sulfide Minerals by Hydrogen in the Presence of Lime," *Metallurgical Transactions*, vol. 4 (Aug. 1973).
International Preliminary Report on Patentability for PCT/US2010/037580 dated Dec. 16, 2011.
International Search Report and Written Opinion for PCT/US2010/037580 mailed Aug. 11, 2010.
International Search Report for PCT/US2011/046726 mailed Jan. 12, 2012.
Katherine Dombrowski, *Effect of SO₃ on Hg Removal by Fly Ash and Activated Carbon*, available at <http://www.netl.doe.gov/publications/proceedings/06/mercury/panel/Dombrowski_Panel_121106.pdf> (Dec. 11, 2006).
Lee et al. "Novel sorbents for mercury emissions control from coal-fired power plants," *J. of the Chinese Inst. of Chem. Eng.*, 39:137-142 (2008).

(Continued)

*Primary Examiner* — Emily Le
*Assistant Examiner* — Michael Forrest
(74) *Attorney, Agent, or Firm* — Marshall, Gerstein & Borun LLP (57) ABSTRACT

A method of preparing a mercury sorbent material comprising making a copper/clay mixture by admixing a dry clay and a dry copper source; making a sulfur/clay mixture by admixing a dry clay and a dry sulfur source; admixing the copper/clay mixture and the sulfur/clay mixture, to form a mercury sorbent pre-mixture; and shearing the mercury sorbent pre-mixture to form the mercury sorbent material. The mercury sorbent material has an interlayer d(001)-spacing of less than 12 Å when the mercury sorbent material contains less than 4 wt % water, and a powder X-ray diffraction pattern of the mercury sorbent material is substantially free of a diffraction peak at 2.73±0.01 Å, and the ζ-potential of the mercury sorbent material is greater than the ζ-potential of the dry clay.

15 Claims, 5 Drawing Sheets

OTHER PUBLICATIONS

Lee et al., "Bench-Scale Studies of In-Duct Mercury Capture Using Cupric Chloride-Impregnated Carbons," *Environ. Sci. Tech.*, 43:2957-2962 (2009).

Lee et al., "Development of Cost-Effective Noncarbon Sorbents for Hg0 Removal from Coal-fired Power Plants," *Environmental Sci. & Tech.*, 40:2714-2720 (2006).

Lee et al., "Modeling of Mercury Oxidation and adsorption by Cupric Chloride-Impregnated Carbon Sorbents," *Ind. Eng. Chem. Res.*, 48:9049-9053 (2009).

Liu et al., "Fuel Processing Technology," *J. Fuel Processing Tech.*, 91:1175-1197 (2010).

Mei et al., "Removal and recovery of gas-phase element mercury by metal oxide-loaded activated carbon," *J. of Hazaradous Materials*, 152:721-729 (2008).

Morency, "Zeolite Sorbent that Effectively Removes Mercury from Flue Gases," www.filtsep.com., feature article, Sep. 24, 2002.

NOL-TEC, "Dry Hydrated Lime Injection for Coal-Fired Boiler flue Gas Desulfurization (FGD)," (2009).

Pavlish et al., "Status review of mercury control options for coal-fired power plants," *Fuel Processing tech.* 82:89-165 (2003).

Plank et al., "Impact of zeta potential of early cement hydration phases on superplasticizer adsorption," *Science Direct*, 37:537-542 (2006).

Qu et al., "The role of iodine monochloride for the oxidation of elemental mercury," *J. of Hazardous Materials, J. of Hazardous Materials*, 183:132-137. (2010).

Vidic et al. "Vapor-phase elemental mercury adsorption by activated Carbon impregnated with chloride and chelating agents," 39:3-14 (2001).

Written Opinion for PCT/US2011/046726 mailed Jan. 12, 2012.

Zhuang et al., "Investigations on bromine corrosion asociated with mercury control technologies in coal flue gas." *Fuel* 88:1692/1697 (2009).

* cited by examiner

HIGH SHEAR METHOD FOR MANUFACTURING A SYNTHETIC SMECTITE MINERAL

FIELD OF THE INVENTION

The present invention is directed to compositions; methods of manufacturing the compositions; and methods of using the compositions for removing mercury (organic mercury, Hg, $Hg^+$; and/or $Hg^{+2}$) from gas streams, e.g., natural gas; industrial smoke stacks; and the like. The compositions, "mercury removal media", are particularly useful for removal of mercury from the flue gasses emitted by coal-burning electrical power plants. The Hg removal media comprises a homogeneous, preferably sheared composition comprising a layered phyllosilicate, sulfur, and copper, resulting in a copper/sulfur/clay material. The copper is ion exchanged with clay cations and the sulfur reacts with the ion exchanged and free copper to form a phyllosilicate bound copper sulfide phase by a combination of mechanisms.

BACKGROUND AND PRIOR ART

Emissions of mercury from coal-fired and oil-fired power plants have become a major environmental concern. Mercury (Hg) is a potent neurotoxin that affects human health at very low concentrations. The largest source of mercury emission in the United States is coal-fired electric power plants. These coal-fired power plants account for between one-third and one-half of total mercury emissions in the United States.

The mercury emission is predominantly through the flue gas (exhaust gas) ejected from the burning coal. There are three basic forms of Hg in the flue gas: elemental Hg; oxidized Hg; and particle-bound mercury.

Currently, the most common method for mercury emissions reduction from coal-fired and oil-fired power plants is the injection of powdered activated carbon into the flue stream. The activated carbon provides a high surface area material for the adsorption of the mercury and the agglomeration of the particle bound mercury. The disadvantage of adding activated carbon into the flue stream is the retention of the activated carbon in the fly ash waste stream. Fly ash from coal-fired power plants if often added to concrete, where the presence of the activated carbon adversely affects the performance.

Another method for reducing Hg emissions is through the addition of chemical species that react with mercury to chemadsorb the elemental Hg and oxidized Hg. One class of materials capable of chemically reacting with Hg are metal sulfides. U.S. Pat. No. 6,719,828 teaches the preparation of layered sorbents such as clays with metal sulfide between the clay layers. The method used to prepare the layered sorbents is based on an ion exchange process, which limits the selection of substrates to only those having high ion exchange capacity. In addition, the disclosed ion exchange is time-consuming, involving several wet process steps significantly impairing the reproducibility, performance, scalability, equipment requirements, and cost of the sorbent. The process of making a sorbent, in accordance with the teachings of U.S. Pat. No. 6,719,828, involves swelling a clay in an acidified solution, introducing a metal salt solution to exchange metal ions between the layers of the clay, filtering the ion exchanged clay, redispersing the clay in solution, sulfidating the clay by adding a sulfide solution, and finally filtering and drying the material. Another shortcoming of the process disclosed in U.S. Pat. No. 6,719,828 the environmental liability of the by-products of the ion exchange process, i.e., the waste solutions of metal ions and the generated hydrogen sulfide.

Published U.S. patent application Ser. No. 11/291,091 teaches the preparation of metal•sulfide/bentonite composites for the removal of mercury from flue gas streams. The application teaches two methods, an incipient wetness process and a solid-state reactive grinding process, to prepare the composites. The processes are similar in that a copper salt is mixed with a bentonite clay and then a sulfide salt is added. The processes differ in the method of addition of the sulfide salt. In the first method the sulfide salt is added through an "incipient wetness" procedure where the sulfide salt is dissolved in water and added to the copper/clay mixture as an aqueous solution; in the second method the sulfide salt is added through a "solid-state reactive grinding" process where the sulfide salt hydrate is ground with the hydrated copper/clay mixture. The application further teaches that the incipient wetness and solid-state grinding methods differ from the "wet" method of U.S. Pat. No. 6,719,828 because there is no ion-exchange of the copper ion for the cationic ions of the bentonite clay. The composite nature of the materials produced in the application are supported by powder X-ray diffraction spectra that provide evidence of the formation of covellite (CuS), the same copper sulfide prepared in U.S. Pat. No. 6,719,828.

While U.S. application Ser. No. 11/291,091 disclaims ion exchange, copper salts and bentonite clays readily and easily ion exchange to yield very stable copper/clay compositions. See e.g., Ding, Z. and R. L. Frost, "Thermal study of copper adsorption on montmorillonites" Thermochimica Acta, 2004, 416, 11-16. Analytical analysis of these compositions confirms both interlayer ion-exchange (intercalation) and edge adsorption of the copper salt. See e.g., El-Batouti et al. "Kinetics and thermodynamics studies of copper exchange on Na-montmorillonite clay mineral" J. Colloid and Interface Sci. 2003, 259, 223-227.

There is still an ongoing need to provide improved pollution control sorbents and methods of their manufacture. It would be desirable to provide sorbents containing metal sulfides on substrates that can be easily and inexpensively manufactured. In this regard, simple and environmentally friendly methods that effectively convert readily available substrates to chemical sorbents, which do not require the numerous steps involved in an ion exchange process, are needed.

SUMMARY

A mercury sorbent material is manufactured making a copper/clay mixture by admixing a dry clay, having less than about 15% by weight water, and a dry copper source, having a water content that consists essentially only of its molecular water of hydration; making a sulfur/clay mixture by admixing a dry clay, having less than about 15% by weight water, and a dry sulfur source, having a water content that consists essentially only of its molecular water of hydration; admixing the copper/clay mixture and the sulfur/clay mixture to form a mercury sorbent pre-mixture, and shearing the mercury sorbent pre-mixture to form the mercury sorbent material; wherein the mercury sorbent material has an interlayer d(001)-spacing of less than 12 Å when the mercury sorbent material contains less than about 4 wt % water, wherein a powder X-ray diffraction pattern of the mercury sorbent material is substantially free of a diffraction peak at 2.73±0.01 Å, and wherein the ζ-potential of the mercury sorbent material is greater than the ζ-potential of the dry clay. In the preferred embodiment, shearing is accomplished by passing the mercury sorbent material through an extruder at a moisture content of about 15% to about 40% by weight, more preferably about 20% to about 30% by weight.

DETAILED DESCRIPTION

The mercury sorbent material described herein is a copper and sulfur containing layered clay material made by the shearing of the sorbent components, particularly clay, a copper source, and a sulfur source. The method disclosed herein is effectuated by both the ion exchange of clay cations with cations of the sorbent copper component and the disruption of the standard reaction pathways. Analytical analyses of the mercury sorbent material described herein show that the material does not include the kinetic reaction products described in the prior art.

In accordance with one aspect of the methods and materials disclosed herein, the mercury sorbent materials includes a silicate clay material. The silicate clay (phyllosilicate) can be a smectite clay, e.g., bentonite, montmorillonite, hectorite, beidellite, saponite, nontronite, volkonskoite, sauconite, stevensite, and/or a synthetic smectite derivative, particularly fluorohectorite and laponite; a mixed layered clay, particularly rectonite and their synthetic derivatives; vermiculite, illite, micaceous minerals, and their synthetic derivatives; layered hydrated crystalline polysilicates, particularly makatite, kanemite, octasilicate (illierite), magadiite and/or kenyaite; attapulgite, palygorskite, sepoilite; or any combination thereof. The clay material should have exchangeable cations. Preferably, the silicate clay material is a montmorillonite with exchangeable calcium and/or sodium ions.

Another important aspect of the methods and materials disclosed herein is a reactive copper compound. As used herein, a reactive copper compound is a copper containing material that reacts with sulfur and/or sulfide ions. The reactive copper compounds provide the methods and materials disclosed herein a copper source. The copper source is preferably a dry material. A dry copper source is herein defined as a reactive copper compound that is in a powdered, flake, or crystalline form that does not contain water in excess of any water(s)-of-hydration within the crystalline structure of the solid copper compound. Non-limiting examples of copper compounds that provide a copper source include the anhydrous and hydrous forms of copper acetate, copper acetylacetonate, copper bromide, copper carbonate, copper chloride, copper chromate, copper ethylhexanoate, copper formate, copper gluconate, copper hydroxide, copper iodide, copper molybdate, copper nitrate, copper oxide, copper perchlorate, copper pyrophosphate, copper selenide, copper sulfate, copper telluride, copper tetrafluoroborate, copper thiocyanate, copper triflate, copper metal, copper alloy, and mixtures thereof. Preferably, the copper source is a Cu(II) salt having a copper cation and a copper salt anion, more preferably the copper source is a Cu(II) salt where the pairing of the copper salt anion with a sodium ion is enthalpically preferable to the pairing with the copper cation, even more preferably the copper source is a Cu(II) salt where the pairing of the copper salt anion with a calcium cation is enthalpically preferable to the pairing with the copper cation, still more preferably the copper source is copper sulfate.

Yet another important aspect of the methods and materials disclosed herein is a reactive sulfur compound. As used herein, a reactive sulfur compound is a sulfur containing materials that reacts with copper and/or copper ions and provides a sulfur atom or polysulfide. The reactive sulfur compounds provide the methods and materials disclosed herein a sulfur source. The sulfur source is preferably a dry material. A day sulfur source is defined herein as a reactive sulfur compound that is in a powdered, flake, crystalline, or gaseous form and does not contain water in excess of any water(s)-of-hydration within the crystalline structure of a solid sulfur source. Non-limiting examples of sulfur compounds that provide a sulfur source include the anhydrous and hydrous forms of sodium sulfide, sodium disulfide, sodium polysulfide, ammonium sulfide, ammonium disulfide, ammonium polysulfide, potassium sulfide, potassium disulfide, potassium polysulfide, calcium polysulfide, and mixtures thereof. Non-limiting examples of sulfur compounds that provide a sulfur source include the anhydrous forms of sulfur, hydrogen sulfide, hydrogen disulfide, aluminum sulfide, magnesium sulfide, thiolacetic acid, thiobenzoic acid, and mixtures thereof. Preferably, the sulfur source is a sulfide or polysulfide salt, more preferably the sulfide source is a sulfide salt, even more preferably, the sulfide source is a sodium sulfide, still more preferably the sulfide source is selected from $Na_2S$, $Na_2S.3H_2O$, and $Na_2S.9H_2O$, and even still more preferably the sulfide source is $Na_2S.3H_2O$.

Still another important aspect of the methods and materials disclosed herein is an absence of a copper+sulfur chemical reaction prior to the shearing of the reactive compounds. One means for preventing copper+sulfur reactivity prior to the shearing of the compounds is by diluting the copper source and the sulfur source with the clay material. One of ordinary skill in the art would recognize that reaction rates are dependent on concentration and that the reaction of the copper source and the sulfide source would be similarly dependent. Moreover, the reaction of the copper source and the sulfide source is inhibited by the absence of free water. The addition of water and the possible formation of copper solutions and/or sulfide solutions would greatly enhance the reaction rates between the copper source and the sulfide source. Herein, any solid state reaction would be dependent on the mobility of the ions and the exposed surface area of the copper source and sulfide source, and therefore this solid state reaction would be very slow.

Preferably, the copper source is mixed with the clay material prior to the addition of this copper/clay mixture to a mechanical shearing apparatus, as disclosed below. Similarly, the sulfur source is preferably mixed with the clay material prior to the addition of this sulfur/clay mixture to a mechanical shearing apparatus. Optionally, the copper/clay mixture and the sulfur/clay mixture can be admixed to form a mercury sorbent pre-mixture prior to the addition of the mercury sorbent pre-mixture to a mechanical shearing apparatus. Yet another method of providing the materials to a mechanical shearing apparatus is by admixing the clay material with the copper source and the sulfur source (optionally, first adding the copper source to the clay materials, then adding the sulfur source of the mercury sorbent pre-mixture or any variation in order thereof). One of ordinary skill would appreciate that the order of addition would vary dependent on the specific (reactive compound) sources. Alternatively, the copper/clay and sulfur/clay mixtures can be added independently to a mechanical shearing apparatus. The addition of single or multiple dry materials to a mechanical shearing apparatus can be by any means available to one of ordinary skill in the art.

In one embodiment, the copper/clay mixture and the sulfur/clay mixture are produced and admixed in a single process wherein the copper source and the sulfur source are added to the clay material. The mixture is then stirred to distribute the copper source and the sulfur source throughout the clay material with a non-shearing mixer to form a mercury sorbent pre-mixture. An example of a non-shearing mixer is a paddle-type mixer.

The masses of added copper source to added sulfide source are adjusted to provide the preferred molar ratios of copper ion and sulfide ion, that are understood to be a measure of the copper atoms and sulfur atoms. For example, when the sulfide source is a polysulfide, the copper ion to sulfide ion ratio represents the molar ratio of copper atoms (ions) to sulfur atoms, the latter having a formula of $S_x^{2-}$ where X is greater than 1. The ratio of copper ion to sulfide ion is in the range of about 0.1 to about 10. Preferably, the ratio (Cu:S) is about 0.1, 0.2, 0.3, 0.4, 0.5, 0.7, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. When the sulfide source is a polysulfide the ratio is generally less than 1. In one preferable embodiment the copper ion to sulfur ion ratio is less than about 1, more preferably less than about 0.5; in another preferable embodiment the ratio is greater than about 1, more preferably greater than about 2.

The copper source is added to the clay material in a weight ratio approximately consistent with the clay's cationic exchange capacity. The cationic exchange capacity is a measure of the molar equivalents of exchangeable clay cations and the weight ratio is a measure of the molar equivalents of cationic copper ions added to the clay. Preferably the addition of the copper source to the clay material is such that about 10 to about 300 millimoles (mmol) of copper are added to about 100 g clay, more preferably about 20 to about 200 mmol Cu to about 100 g clay, still more preferably about 50 to about 150 mmol Cu to about 100 g clay.

Still another important aspect of the materials and methods presented herein is the shearing of the mercury sorbent pre-mixture. Mechanical shearing methods may employ extruders, injection molding machines, Banbury® type mixers, Brabender® type mixers, pin-mixers, and the like. Shearing also can be achieved by introducing a copper/clay mixture and a sulfur/clay mixture at one end of an extruder (single or double screw) and receiving the sheared material at the other end of the extruder. The temperature of the materials entering the extruder, the temperature of the extruder, the concentration of materials added to the extruder, the amount of water added to the extruder, the length of the extruder, residence time of the materials in the extruder, and the design of the extruder (single screw, twin screw, number of flights per unit length, channel depth, flight clearance, mixing zone, etc.) are several variables which control the amount of shear applied to the materials.

Preferably, water is added to the mechanical shearing unit to facilitate the shearing of the mercury sorbent pre-mixture as well as the reactions of the copper with the clay (ion exchange), and the copper with the sulfur. Due to the variability in the design of most mechanical shearing units, e.g. the feed capacity, the amount of water added to the unit is preferably defined by the weight percentage of water in the sheared material. Preferably, the mercury sorbent material, after exiting the mechanical shearing unit, comprises about 15 wt. % to about 40 wt. % water, more preferably about 20 wt. % to about 30 wt. % water, even more preferably about 23 wt. % to about 28 wt. % water.

Figure 1:
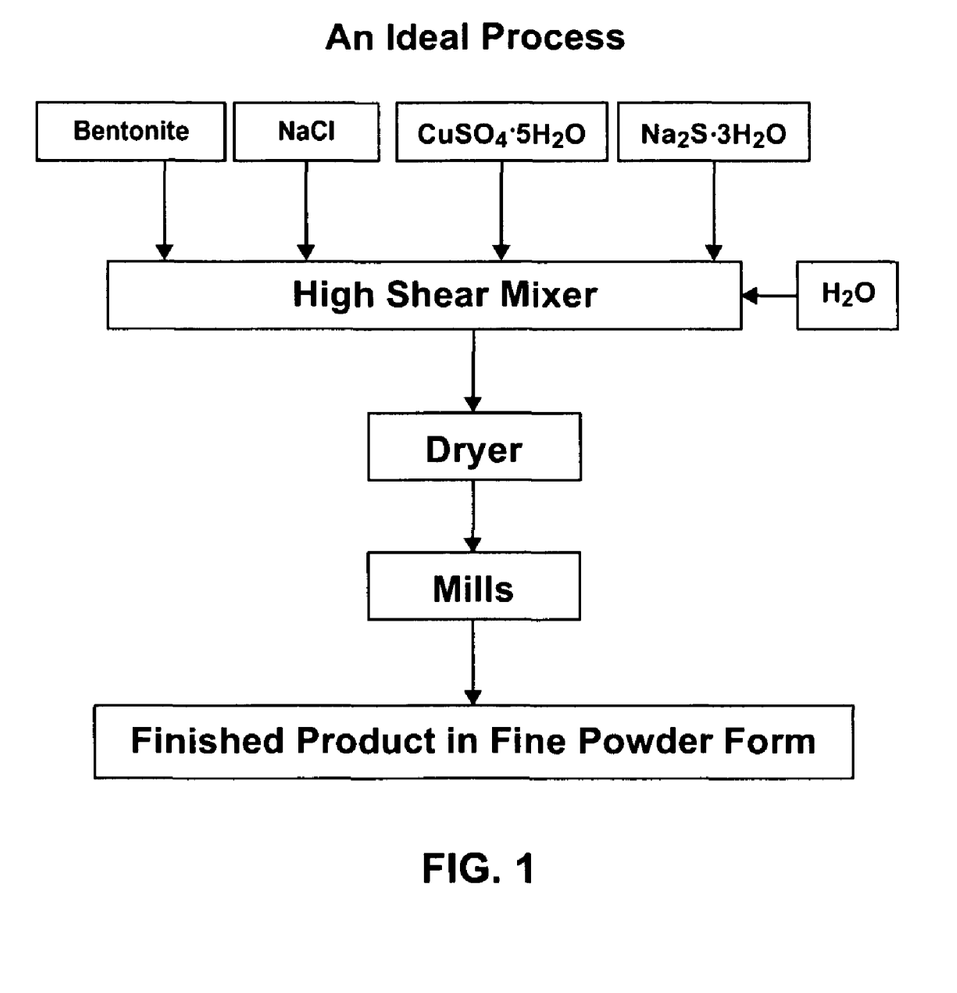
FIG. 1 is a process diagram for making mercury sorbent material by shear mixing.
Figure 2:
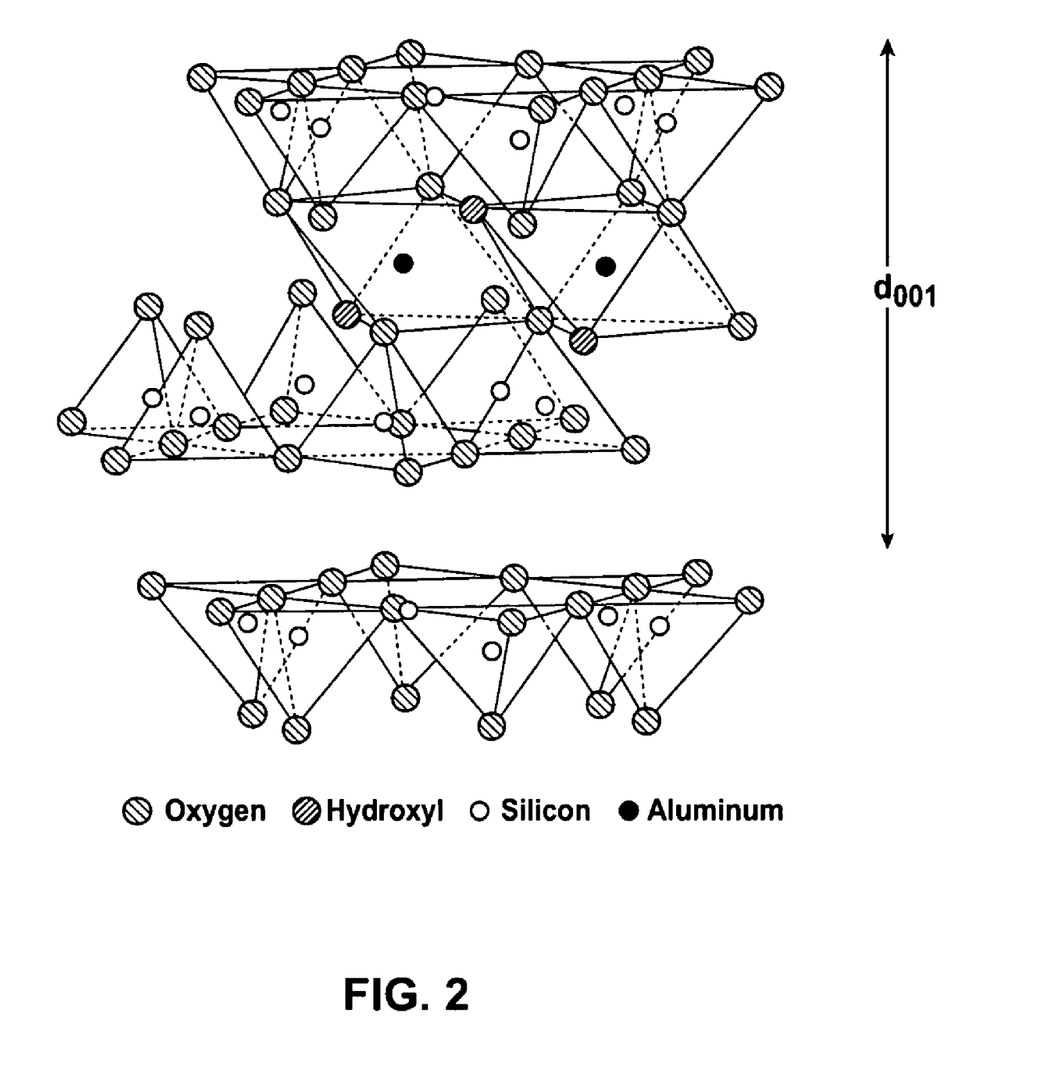
FIG. 2 is a drawing of a montmorillonite structure indicating the d(001)-spacing as can be determined by powder X-ray diffraction.
Figure 3:
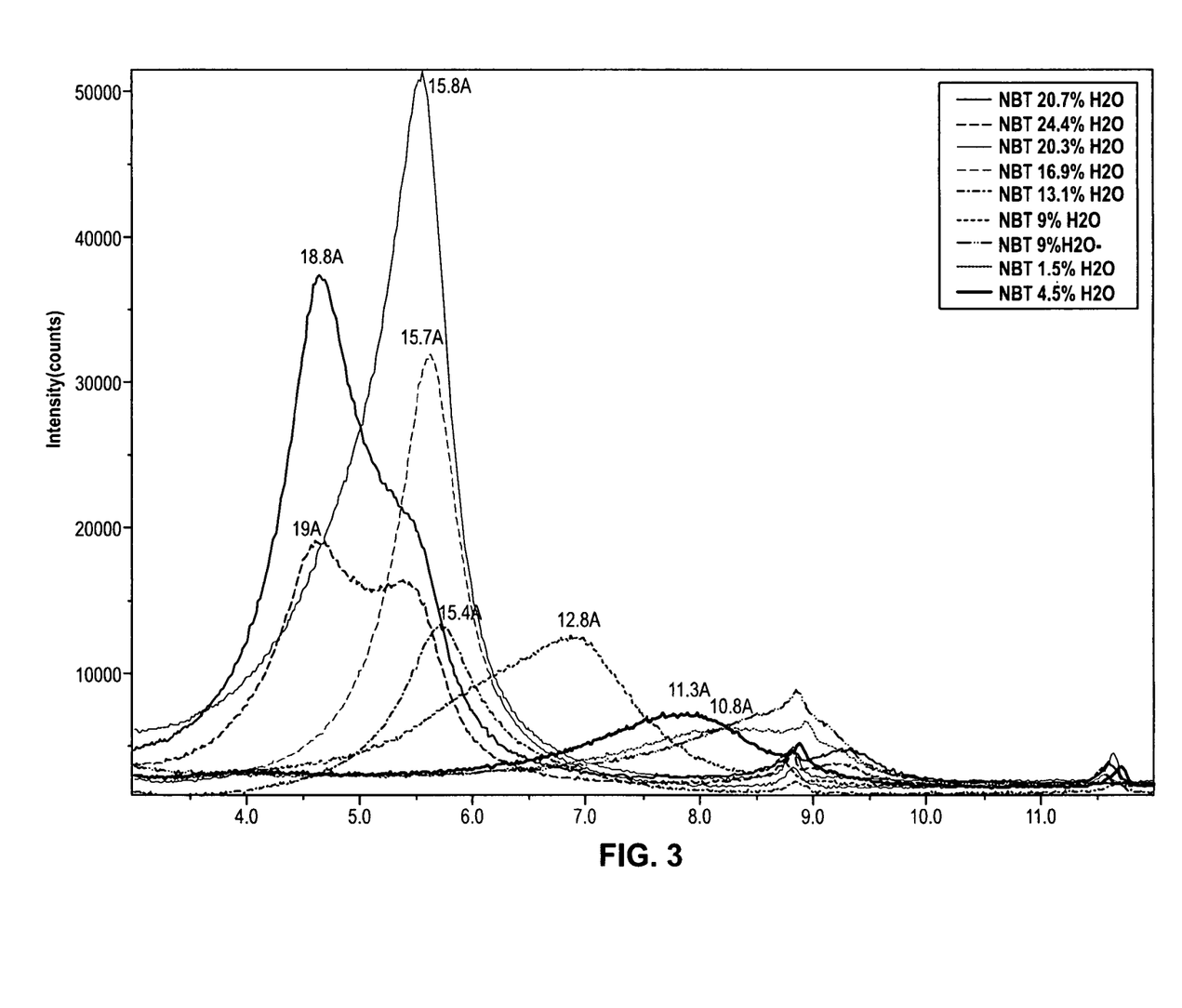
FIG. 3 is a composite drawing of powder X-ray diffraction patterns for sodium montmorillonite. The lines represent the low-angle diffraction patterns for the sodium montmorillonite containing from about 0.9 wt. % to about 24.4 wt. % water.
Figure 4:
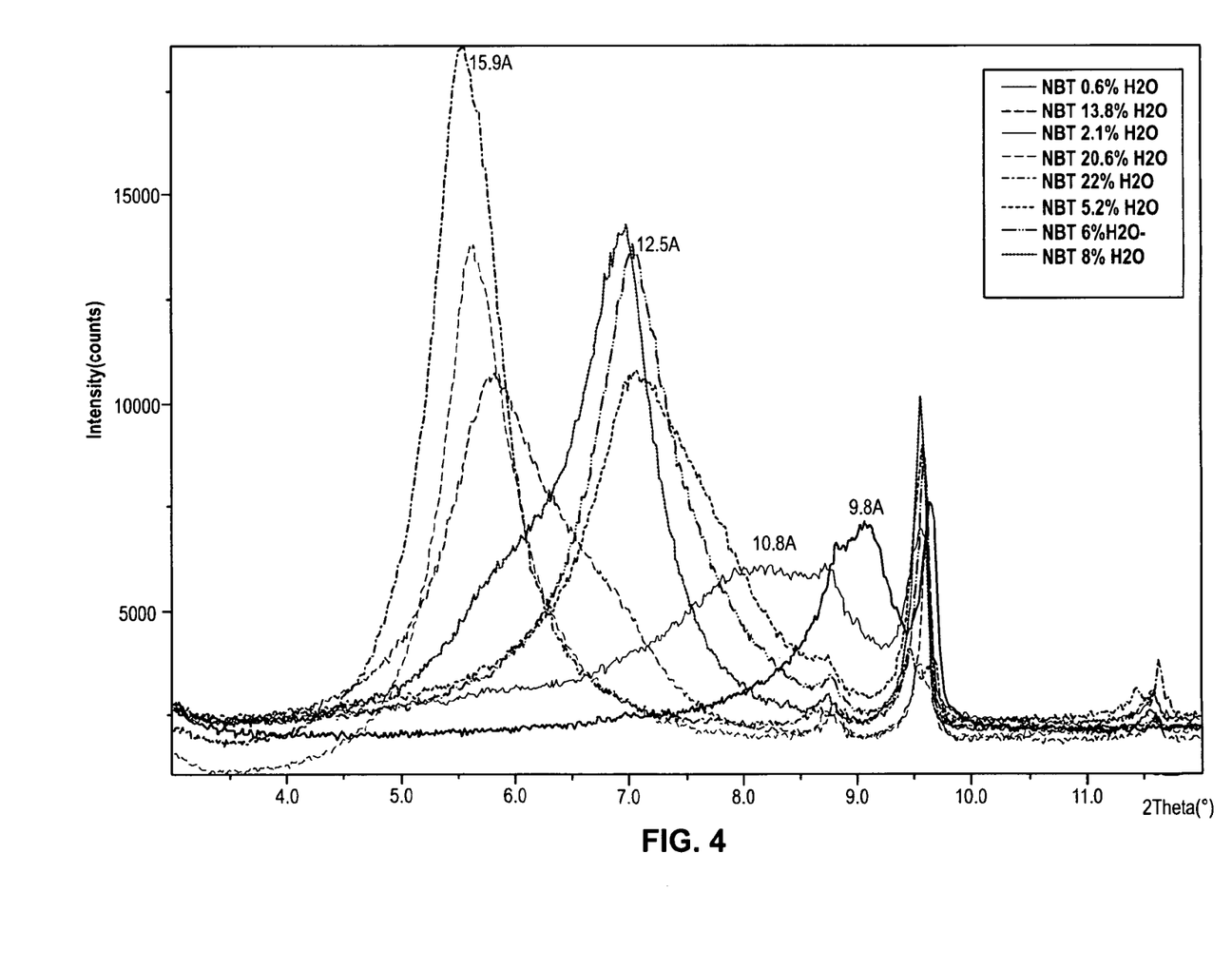
FIG. 4 is a composite drawing of powder X-ray diffraction patterns for a herein described mercury sorbent material. The lines represent the low-angle diffraction patterns for the material containing from about 0.6 wt. % to about 22 wt. % water.

One method for determining the structure and composition of the materials disclosed herein is through powder X-ray diffraction (powder XRD). The powder XRD patterns of clay materials are characterized by a broad, low angle peak corresponding to the inter-silicate-layer spacing. See FIG. 2. Often used to determine the moisture content of water swellable clays, the angle where the peak maximum of this low angle peak decreases with increasing inter-layer spacing, see FIG. 3, wherein the peak maximum decrease with increasing water adsorbed into the inter-layer space. For example, a diffraction angle of about 7° two theta (2Θ) in a sodium montmorillonite clay corresponds to an interlayer d(001) spacing of about 12 Å and an angle of about 9° 2Θ corresponds to an interlayer d(001) spacing of about 9 Å, close to the thickness of the clay platelet. Changes to the interlayer d(001) spacing for montmorillonite clays and clay samples with added copper ion was thoroughly investigated by Burba and McAtee in "The Orientation and Interaction of Ethylenediamine Copper (II) with Montmorillonite" *Clays and Clay Minerals*, 1977, 25, 113-118. Therein, the intercalation and multi-platelet binding of copper ions was reported and an average interlayer d(001) spacing for Cu(II) montmorillonite samples was about 12.5 Å. The layered copper-sulfide//silicate//copper-sulfide materials disclosed in U.S. Pat. No. 6,719,828 would have a interlayer d(001) spacing significantly greater than 12.5 Å due to the added thickness of the copper-sulfide layers. The surface deposited copper sulfide materials disclosed in U.S. patent application Ser. No. 11/291,091 would exhibit the same interlayer d(001) spacing as the original montmorillonite (e.g., FIG. 3) because, as taught, the copper-sulfide, therein, deposits only on the surface of the clay. Herein, the methods and materials were found to have interlayer d(001) spacings less then about 12 Å when the moisture content of the materials was less than 4 wt. %. See e.g., FIG. 4. Indicating that the materials and methods described herein do not conform to the structures taught in the prior art.

Figure 5:
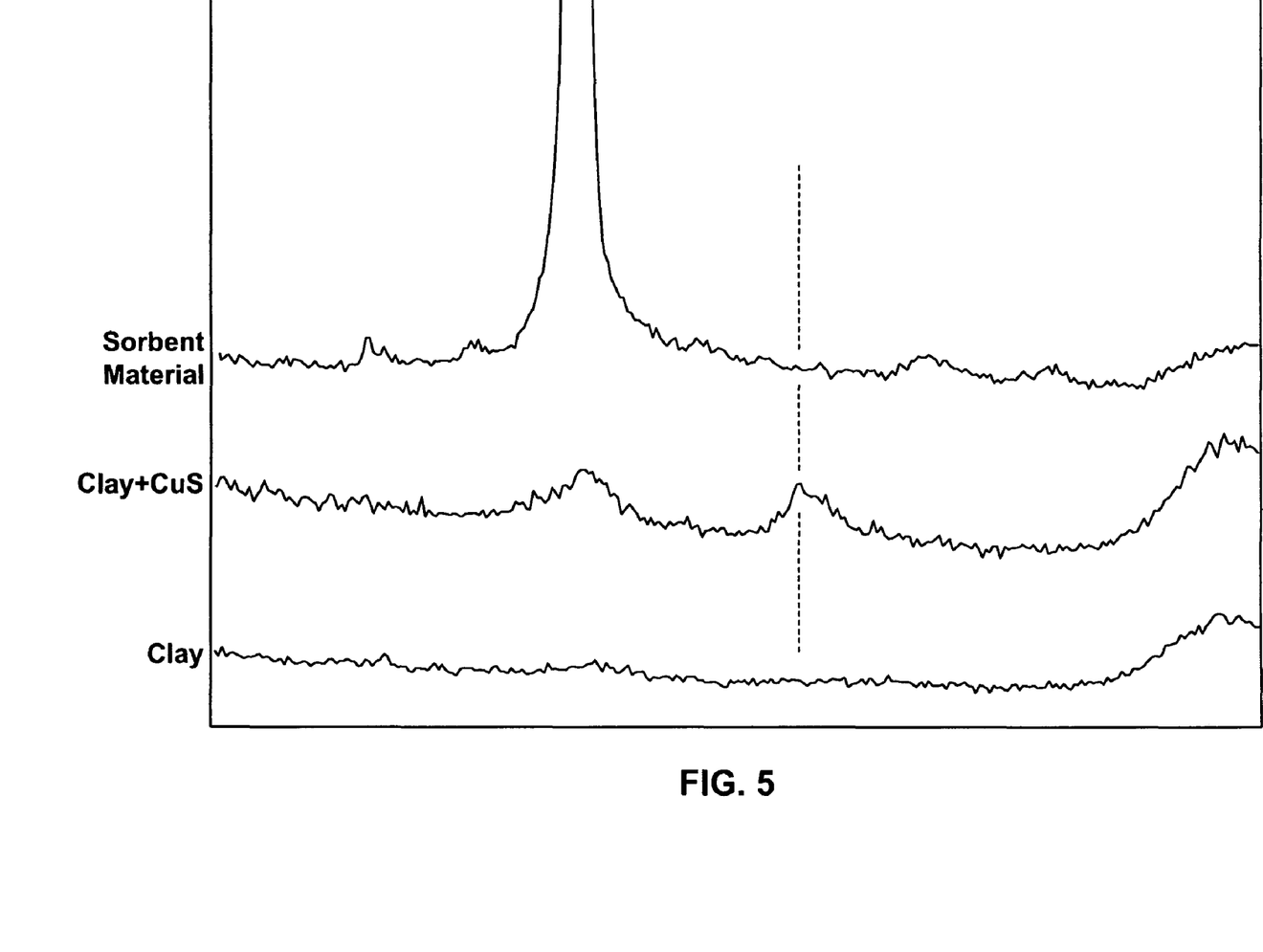
FIG. 5 is a composite drawing of the powder X-ray diffraction patters between about 30 and 35 2·Θ for samples of a sodium montmorillonite, a sodium montmorillonite containing about 4.5 wt. % covellite, and the herein described mercury sorbent material containing the equivalent of 4.5 wt. % copper sulfide.

Moreover, the mercury sorbent materials disclosed herein are substantially free of covellite, the copper sulfide mineral disclosed in U.S. patent application Ser. No. 11/291,091. Covellite is the kinetic product of copper(II) ions with sulfide ($S^{2-}$) ions and has a formula of CuS. The powder XRD pattern of covellite contains at least four signature reflections; three of these reflections overlap with reflections in montmorillonite clay materials. The reflection at 2.73±0.01 Å (where the variability in the location of the reflection is dependent in part on the accuracy of the diffractometer) is characteristic of the covellite material and is observable in clay predominating samples. FIG. 5 shows three powder XRD patters in the 30° to 35° 2Θ range. The XRD pattern for copper sulfide free clay is shown on the bottom; the XRD pattern for clay containing 4.5 wt. % covellite is shown in the middle; the XRD patter for a herein disclosed clay material containing the equivalent of 4.5 wt. % copper sulfide is shown on the top. The covellite reflection at 2.73 Å was marked with a vertical dashed line. As is clearly indicated by the powder XRD pattern the herein disclosed material is substantively free of the diffraction peak at 2.73±0.01 Å.

Yet another important aspect of the materials and methods disclosed herein are zeta (ζ)-potential values for the mercury sorbent materials being higher (less negative) then the ζ-potential values for the clay materials used to manufacture the mercury sorbent materials. The surface charge on a microparticulate, e.g., a clay, can often be determined by a measurement of the ζ-potential and/or electrophoretic mobility. The structures of the clays applicable herein are composed in part of silicon-oxygen (silicate) arrangements as described by Bragg et. al. in *Crystal Structures of Minerals*, pp. 166-382 (Cornell University Press 1965), and incorporated herein for the structures and formulas of silicate materials. The silicate portion of a clay often has an anionic charge that is balanced in the material by the inclusion of Alkali Metal and/or Alkali Earth cations. The suspension of these materials and measurement of their ζ-potential provides a means for assessing the ion paring (cations to silicate) in the clay material. The lower (more negative) the ζ-potential the greater the percentage of weak ionic interactions between the cations and the silicate. Higher (less negative) ζ-potentials indicate stronger ionic interactions or covalent interactions between the cations and the silicate. The blending of neutral materials with the clay material would not be expected to change the ζ-potential of the clay material. Ion exchange of the Alkali Metal and/or Alkali Earth cations of the clay material would be expected to change the ζ-potential if the exchanged for ion has a different binding energy with the silicate.

Still another important aspect of the materials and methods disclosed herein is a material particle diameter that can be trapped by particulate collectors in coal-fired electrical power plants. Preferably, average particle diameters are greater than 0.1 μm, still more preferably greater than 1 μm. The preferred average particle diameter of the mercury sorbent materials described herein, for the sorption of mercury in flue gases, is dependent on the particulate collectors at the individual power plants. Examples of particulate collectors include baghouse fabric filters, electrostatic precipitators, and cyclone collectors. Generally and well known in the art, larger particles are easier to remove from flue gasses. Preferably, the majority of particles have a diameter in the range of about 1 to about 100 μm, more preferably in the range of about 1 to about 50 μm, most preferably about 10 to about 25 microns.

Unexpectedly, the materials disclosed herein were not reduced in size by the shearing processes, described above. Shearing, specifically high-shear mixing, is well known to reduce the particle size of clay materials by delamination of the silicate layers. Herein, the sheared materials were found to have larger particle diameters than those of the dry (less than about 15% by weight moisture content) clay starting material. Moreover, the particle diameter distribution was found to vary based on the mechanical shearing method. Samples that were sheared with a pin-mixer were found to have a majority average particle diameter of about 3.8 μm and a minority average particle diameter of about 20 μm. Samples that were sheared with an extruder were found to have the same average particle diameters and an additional minority average particle diameter of about 40 μm. Without being bound to any specific theory it is hypothesized that the growth of the 20 μm and 40 μm particle size materials is a feature of the delamination of the clay material, the growth of copper sulfur materials on step edges, and the agglomeration of the exposed clay faces on or about the charged copper sulfur phases.

Yet another important aspect of the materials and methods described herein is the irreversible binding of mercury from the flue gas stream to the mercury sorbent materials described herein. Herein, irreversible binding means that the sequestered mercury is not leached from the mercury sorbent material by water or solvents that are primarily water.

The mercury sorbent material may be retained in a fly ash waste stream. While activated carbon containing fly ash can be detrimental to concrete formation and stability, mercury sorbent material containing fly ash are preferably not detrimental to the formation and/or stability of concrete. Preferably, the mercury sorbent material does not increase the amount of an air-entrainment agent (AEA) necessary for the formation of concrete, one measure of which is a Foam Index test value. More preferably, the mercury sorbent material does not adsorb or reaction with the AEA, even more preferably the mercury sorbent materials aids the AEA in forming stable 10 to 250 μm pockets within the finished concrete. Moreover, the sorbed (sequestered) mercury preferably does not leach from the mercury sorbent material during or after the concrete formation process. Additionally, the inclusion of the mercury sorbent material preferably inhibits the degradation of concrete. Methods of inhibiting degradation of concrete include limiting and/or preventing the alkali silicate reaction, carbonation, sulfate attack, leaching, and/or structural damage from freeze/thaw cycling. Without being bound to any particular theory, the herein described materials preferably inhibits the degradation of concrete though water adsorption and limited expansion thereby improving the freeze/thaw cycling of the concrete and/or through prevention of ion leaching. An additional benefit of the herein described materials is the similarity in bulk structure to cement, silicate-aluminate materials, preferably supporting chemical binding of the mercury sorbent material into prepared concrete.

Mercury sorbents can be tested and evaluated for their performance under different conditions:

A laboratory bench scale test uses nitrogen, air or simulated flue gas, and typically the sorbent is placed in a fixed bed. The simulated flue gas has a composition of $SO_2$, $NO_x$, HCl, $CO_2$, $O_2$, $H_2O$ and $Hg^0$ under an elevated temperature. The gas is passed through the sorbent bed at a certain flow rate. The effluent gas is analyzed for its mercury concentration by a mercury analyzer. The test is allowed to proceed until adsorption equilibrium has been reached. Both the mercury removal efficacy and sorption capacity can be concluded at the end of the test. The factors having influence on the results are temperature, oxidation state of mercury and composition of the flue gas. The bench scale test is a very economic way to screen sorbents.

A pilot scale test is very effective to study sorbent performance under conditions close to the true industrial conditions. The test unit is normally set-up for an in-flight test. The simulated flue gas, or a slip stream flue gas can be extracted from an industrial facility, such as a power plant's ESP (electrostatic precipitator) or a fabric filter unit can be used to house the sorbent. The sorbent is injected into the test system and the mercury concentration is monitored for the mercury concentration change. The contact time between sorbent and flue gas need be only a few seconds.

Lastly, a full scale power plant test can be arranged. The design and selection of injection systems and rapid and accurate measurement of mercury concentration are important factors during the evaluation period.

EXAMPLES

The following examples are provided to illustrate the invention, but are not intended to limit the scope thereof.

Example 1

In the bowl of a KITCHENAID stand mixer, 368.5 g sodium bentonite (85% passing 325 mesh), 16.5 g sodium chloride (from United Salt Corporation, passing 20 mesh), 57.0 copper sulfate pentahydrate (Old Bridge Chemicals, Inc. passing 40 mesh), and 31.0 g sodium sulfide trishydrate (Chem One Ltd.) were admixed for 5 minutes. Then 74.0 g de-ionized water was added to the mixture and the mixture was stirred 5 minutes. The mercury sorbent mixture was then extruded three times using a laboratory-scale extruder with a die-plate. The extrudates were then oven-dried at 100° C. The dried extrudates were ground and resulting particles passing through a 325 mesh screen were collected. The final moisture content of this sample was approximately 2 wt. %.

Example 2

In the bowl of a KITCHENAID stand mixer, 232.0 g sodium bentonite, 26.4 g sodium chloride, 91.2 g copper sulfate pentahydrate, and 49.6 g sodium sulfide trishydrate were admixed for 5 minutes. Then 52.4 g de-ionized water was added to the mixture and the mixture was stirred 5 minutes. The mercury sorbent mixture was then extruded three times using a laboratory-scale extruder with a die-plate. The extrudates were then oven-dried at 70° C. The dried extrudates were ground and resulting particles passing through a 325 mesh screen were collected. The final moisture content of this sample was approximately 3.5 wt. %.

Example 3

A mercury sorbent mixture was prepared by admixing 2,060 lbs sodium bentonite, 92.2 lbs sodium chloride, 318.6 lbs copper sulfate pentahydrate, 173.3 lbs sodium sulfide trishydrate in the bowl of a paddle mixer. The mixture was combined for 20 minutes and then fed into a 5 inch READCO continuous processor (by Readco Manufacturing Inc.) at a feed rate of about 900 lb/hr. As the mercury sorbent mixture was fed into the processor, water was fed into the processor through a liquid injunction port (separate from the dry-mixture feed port) at about 0.35 gallon/minute. The extrudate was dried at about 100° C. and ground to reduce the particle size. The mercury sorbent materials was found to have an average particle size of about 5 to about 25 µm and a moisture content below 10 wt. %.

Example 4

A mercury sorbent mixture was prepared by admixing 700 lbs sodium bentonite, 31.3 lbs sodium chloride, 108.3 lbs copper sulfate pentahydrate, and 59.0 lbs sodium sulfide trishydrate in the bowl of a paddle mixer. The mixture was combined for 20 minutes and then fed into a 16" pin mixer (Mars Mineral) at a feed rate of about 1,100 lb/hr. As the mercury sorbent mixture was fed into the pin mixer, water was fed into the processor through a liquid injunction port (separate from the dry-mixture feed port) at about 0.35 gallon/minute. The extrudate was dried at about 100° C. and ground to reduce the particle size. The mercury sorbent materials was found to have an average particle size of about 5 to about 25 µm and a moisture content below 10 wt. %.

The foregoing description is given for clearness of understanding only, and no unnecessary limitations should be understood therefrom, as modifications within the scope of the invention may be apparent to those having ordinary skill in the art.

What is claimed:

1. A method of manufacturing a mercury sorbent material comprising:
   making a copper/clay mixture by admixing a dry clay and a dry copper source,
   making a sulfur/clay mixture by admixing a dry clay and a dry sulfur source,
   admixing the copper/clay mixture and the sulfur/clay mixture to form a mercury sorbent pre-mixture,
   inhibiting a reaction of the copper source and the sulfide source by the absence of free water therein, and then
   forming the mercury sorbent material by shearing the mercury sorbent pre-mixture;
   wherein the mercury sorbent material has an interlayer d(001)-spacing of less than 12 when the mercury sorbent material contains less than 4 wt % water, wherein a powder X-ray diffraction pattern of the mercury sorbent material is substantially free of a diffraction peak at 2.73±0.01 Å, and wherein the ζ-potential of the mercury sorbent material is greater than the ζ-potential of the dry clay.

2. The method of claim 1, wherein the clay in the copper/clay mixture, and in the sulfur/clay mixture, has less than about 15% by weight water, and wherein shearing comprises passing the mercury sorbent pre-mixture through an extruder and wherein the method further comprises adding water to the mercury sorbent pre-mixture such that the extruded pre-mixture has about 15% to about 40% by weight water.

3. The method of claim 1, wherein shearing comprises passing the pre-mixture through a pin mixer and wherein the method further comprises adding water to the pre-mixture such that when mixed in the pin mixer, the pre-mixture contains about 15% to about 40% weight water.

4. The method of claim 1, wherein the clay comprises a phyllosilicate selected from the group consisting of bentonite, montmorillonite, hectorite, beidellite, saponite, nontronite, volkonskoite, sauconite, stevensite, fluorohectorite, laponite, rectonite, vermiculite, illite, a micaceous mineral, makatite, kanemite, octasilicate (illierite), magadiite, kenyaite, attapulgite, palygorskite, sepoilite, and a mixture thereof.

5. The method of claim 4, wherein the clay comprises a montmorillonite.

6. The method of claim 1, wherein the dry copper source comprises a copper salt selected from the group consisting of anhydrous copper compounds selected from the group consisting of copper acetate, copper acetylacetonate, copper bromide, copper carbonate, copper chloride, copper chromate, copper ethylhexanoate, copper formate, copper gluconate, copper hydroxide, copper iodide, copper molybdate, copper nitrate, copper oxide, copper perchlorate, copper pyrophosphate, copper selenide, copper sulfate, copper telluride, copper tetrafluoroborate, copper thiocyanate, copper triflate, copper alloy, and a mixture thereof; and copper compound hydrates selected from the group consisting of copper acetate, copper acetylacetonate, copper bromide, copper carbonate, copper chloride, copper chromate, copper ethylhexanoate, copper formate, copper gluconate, copper hydroxide, copper iodide, copper molybdate, copper nitrate, copper oxide, copper perchlorate, copper pyrophosphate, copper selenide, copper sulfate, copper telluride, copper tetrafluoroborate, copper thiocyanate, copper triflate, copper alloy, and a mixture thereof.

7. The method of claim 1, wherein the dry sulfur source comprises a sulfur salt selected from the group consisting of sodium sulfide, sodium sulfide trishydrate, sodium sulfide nonahydrate, sodium disulfide, sodium polysulfide, ammonium sulfide, ammonium disulfide, ammodium polysulfide, potassium sulfide, potassium disulfide, potassium polysulfide, calcium polysulfide, and a mixture thereof.

8. The method of claim 1, wherein the dry sulfur source is selected from the group consisting of hydrogen sulfide, hydrogen disulfide, aluminum sulfide, magnesium sulfide, thiolacetic acid, thiobenzoic acid, and a mixture thereof.

9. A method of manufacturing a mercury sorbent material comprising:
shearing a dry clay containing an exchangeable cation and less than about 15 wt. % water with a sulfide salt having essentially no free water and with a copper salt having essentially no free water and having a copper cation and a copper salt anion;
wherein an ion pairing of the clay exchangeable cation with the copper salt anion is enthalpically preferable to a pairing of the copper cation with the copper salt anion;
wherein the shearing is exothermic; and wherein the mercury sorbent material is capable of removing mercury from a gas stream.

10. A mercury sorbent material comprising a sheared, ion-exchanged heterogeneous clay material that comprises clay, copper and sulfur but is free of a clay/covellite composite as determined by powder X-ray diffraction, the power X-ray diffraction pattern being substantially free of a peak at 2.73±0.01 Å, wherein the ion-exchanged, heterogeneous clay material is made by shearing a mixture of a clay, a copper ion source, a sulfide ion source, and water.

11. The mercury sorbent material of claim 10, wherein the copper ion source is selected from the group consisting of copper acetate, copper acetylacetonate, copper bromide, copper carbonate, copper chloride, copper chromate, copper ethylhexanoate, copper formate, copper gluconate, copper hydroxide, copper iodide, copper molybdate, copper nitrate, copper oxide, copper perchlorate, copper pyrophosphate, copper selenide, copper sulfate, copper telluride, copper tetrafluoroborate, copper thiocyanate, copper triflate, copper alloy, and a mixture thereof; and copper compound hydrates selected from the group consisting of copper acetate, copper acetylacetonate, copper bromide, copper carbonate, copper chloride, copper chromate, copper ethylhexanoate, copper formate, copper gluconate, copper hydroxide, copper iodide, copper molybdate, copper nitrate, copper oxide, copper perchlorate, copper pyrophosphate, copper selenide, copper sulfate, copper telluride, copper tetrafluoroborate, copper thiocyanate, copper triflate, copper alloy, and a mixture thereof; and wherein the sulfide ion source is selected from the group consisting of sodium sulfide, sodium sulfide trishydrate, sodium sulfide nonahydrate, sodium disulfide, sodium polysulfide, ammonium sulfide, ammonium disulfide, ammodium polysulfide, potassium sulfide, potassium disulfide, potassium polysulfide, calcium polysulfide, and a mixture thereof.

12. The mercury sorbent material of claim 10, wherein a ratio of copper to sulfur is less than 1.

13. The mercury sorbent material of claim 12, wherein the ratio is less than 0.5.

14. The mercury sorbent material of claim 10, wherein a ratio of copper to sulfur is greater than 1.

15. The mercury sorbent material of claim 14, wherein the ratio greater than 2.

* * * * *

UNITED STATES PATENT AND TRADEMARK OFFICE
CERTIFICATE OF CORRECTION

PATENT NO.       : 8,268,744 B2
APPLICATION NO.  : 12/485561
DATED            : September 18, 2012
INVENTOR(S)      : Wang It is certified that error appears in the above-identified patent and that said Letters Patent is hereby corrected as shown below:

In the Claims

In Column 10, Line 22, in Claim 1, delete "12" and insert -- 12 Å --, therefor.

In Column 11, Line 8, in Claim 7, delete "ammodium" and insert -- ammonium --, therefor.

In Column 12, Lines 22-23, in Claim 11, delete "ammodium" and insert -- ammonium --, therefor.

In Column 12, Line 33, in Claim 15, delete "ratio" and insert -- ratio is --, therefor.

Signed and Sealed this
Eighteenth Day of November, 2014

Michelle K. Lee
*Deputy Director of the United States Patent and Trademark Office*